United States Patent [19]

Ernstoff et al.

[11] 3,783,184

[45] Jan. 1, 1974

[54] ELECTRONICALLY SWITCHED FIELD SEQUENTIAL COLOR TELEVISION

[75] Inventors: Michael N. Ernstoff, Mar Vista; Eric R. Fehr, Los Angeles; William C. Hoffman; Richard N. Winner, both of Torrance, all of Calif.

[73] Assignee: Hughes Aircraft Company, Culver City, Calif.

[22] Filed: Mar. 8, 1972

[21] Appl. No.: 232,890

[52] U.S. Cl. .......... 178/5.4 BD
[51] Int. Cl. .......... H04n 9/12
[58] Field of Search .......... 178/5.4 R, 5.4 BD

[56] References Cited

UNITED STATES PATENTS

| | | | |
|---|---|---|---|
| 2,727,941 | 12/1955 | Fulmer | 178/5.4 BD |
| 2,638,816 | 5/1953 | Stolzer | 178/5.4 BD |
| 3,637,931 | 1/1972 | Donjon et al | 178/5.4 BD |
| 3,666,881 | 5/1972 | Stein | 178/5.4 BD |

FOREIGN PATENTS OR APPLICATIONS

| | | | |
|---|---|---|---|
| 1,916,248 | 10/1969 | Germany | 178/5.4 BD |

*Primary Examiner*—Richard Murray
*Attorney*—W. H. MacAllister et al.

[57] ABSTRACT

A high brightness, field sequential color television display system utilizing electronically controlled color switching of ferro-electric ceramic wafers. The stationary filter provides a color change electronically and color switching is the result of selected retardations of the signals for each of the basic red, green and blue colors so that a rapid field sequential operation is performed. The system employs two polaroid filters, the polarizer and the analyzer, with a ceramic material positioned intermediate thereto, to control the polarization of the light passing through it by the desired amounts and therefore provide the primary colors. Wavelength selection over a relatively narrow bandwidth is thus achieved by using a material with the property to obtain angles for transmission as a function of the wavelength. The color image is formed in the field sequential fashion by placing the spectral filter in front of a cathode ray tube and observing the various intensities of white light on the face of the tube through the composite filter.

3 Claims, 10 Drawing Figures

ELECTRONICALLY SWITCHED FIELD SEQUENTIAL COLOR TELEVISION

The invention herein described was made in the course of or under a Contract or Subcontract thereunder with the Navy.

BACKGROUND OF THE INVENTION

1. Field of the Invention

This invention relates to display systems and particularly to an electronically controlled field sequential color television system that provides a high resolution composite picture without the requirements of mechanical motion.

2. Description of the Prior Art

Conventionally, television type displays have been unable to develop a high resolution, high brightness and high quality color display when using a shadow mass technique or when using a trinoscope type color arrangement. A system that does provide a relatively high resolution, high brightness and good quality color picture is field sequential color television as is well known in the art, which operates on the basis of color pictures broken up into three pictures. Each monochromatic picture represents one of the three primary color components which are then transmitted sequentially to be recombined by the eye when viewed on the receiver. The receiver may consist of a monochrome television monitor with a set of three color filters sequentially passing in front of it, with the motion thereof properly synchronized so that each picture component is displayed through its associated color filter. This type of system may have an interlaced format or a format in which all adjacent lines are sequentially scanned. Because the picture components are presented at a relatively rapid rate, the images appear to the eye to fuse into a composite full color image. Another advantage of a field sequential color display system is that it will operate where environmental vibration does not permit the use of shadow mask technique or the trinoscope type color arrangement. When bandwidth is a problem with field sequential color television, bandwith reduction techniques may be utilized such as described in Ser. No. 115, 553 entitled, "Improved Television Display System", invented by Michael N. Ernstoff et al and filed Feb. 16, 1971. A field sequential color television system operating without the disadvantages of mechanical motion and of the large volume required for color wheels to move, would be a substantial advantage to the art.

SUMMARY OF THE INVENTION

The system in accordance with the invention utilizes a spectral filter consisting of a polarizer, an analyzer, and an intermediate structure formed from a ferro-electric ceramic wafer properly oriented therebetween. For light to pass through this composite filter, its initial polarization, after passing through the polarizer, must be rotated by the intermediate structure to the polarization of the analyzer. Wavelength selection is achieved by using a ferro-electric material with a property to obtain the angle for transmission as a function of the wavelength of each of the basic colors red, green and blue. Electronic control over the wavelength selection mechanization can be achieved by using a ceramic wafer of a selected thickness so that rotation to the angle of transmission is dependent upon the electric field developed across sections of the ceramic wafer by an interdigital finger structure, for example. The color image is achieved by placing the composite filter in front of an image forming device such as a cathode ray tube and switching the ceramic wafer in a field sequential fashion and in synchronsim with the scan of the cathode ray tube gun upon its display surface. Each of the components red, green and blue colors of the image are presented as various intensities of white on the face of the cathode ray tube. The composite filter is electronically switched in synchronsim with each field scan so as to sequentially permit only the red, green or blue components of the white light to pass to the eye of the viewer. When the above procedure is repeated sequentially in succession at a rate above the flicker fusion frequency, the three individual color images are merged by the observer into one full color image.

It is therefore an object of this invention to provide a high resolution and high brightness television display.

It is a further object of this invention to provide an electronic field sequential type color television display not requiring mechanical motion.

It is another object of this invention to provide a color display system that operates in a field sequential manner in response to electronic signals.

It is another object of this invention to provide a field sequential color television system that requires a minimum of space and components.

BRIEF DESCRIPTION OF THE DRAWINGS

These and other objects, features and advantages of the invention itself, will become apparent to those skilled in the art, in the light of the following detailed description, taken in consideration with the accompanying drawings wherein like reference numerals indicate like or corresponding parts throughout the several parts wherein.

DESCRIPTION OF THE PREFERRED EMBODIMENT

Figure 1:
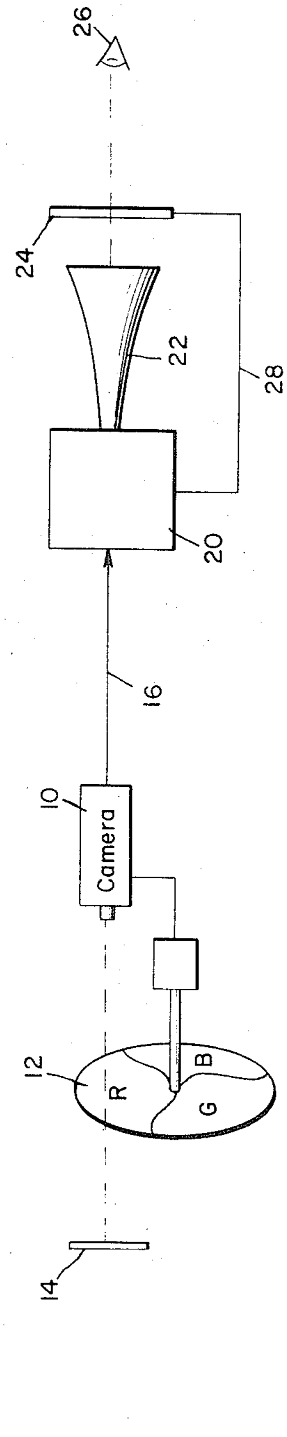
FIG. 1 is a schematic block diagram of a camera and TV display system utilizing the field sequential color television system in accordance with the invention.

Referring first to FIG. 1, the television system may include a camera 10 viewing a scene 14 through a rotating color filter wheel 12, for example, and supplying signals and synchronizing pulses over a suitable connecting lead or link 16 to a display control system 20. A suitable display tube such as a cathode ray tube 22 scanned in a raster fashion to provide the scene 14, may be included in the display control system 20 to provide white light to a tunable color filter 24 which sequentially provides red, green and blue basic colors to the eye or viewer 26. In accordance with the invention the filter 24 is electronically controlled from the display control unit 20 through a suitable composite lead 28.

Figure 2:
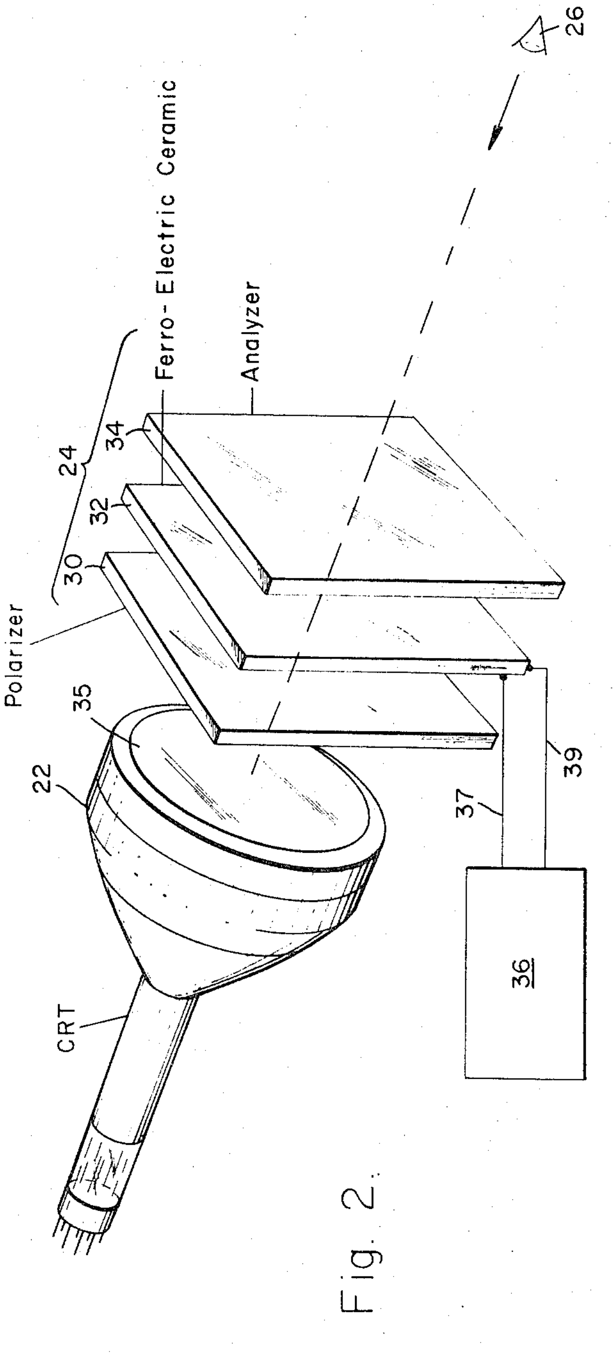
FIG. 2 is a schematic perspective diagram further showing the field sequential color television system in accordance with the invention.

Referring now also to FIG. 2, the electronically switched color filter 24 is shown in greater detail including a polarizer 30 receiving white light from a surface 35 of the cathode ray tube 22 to apply polarized light to a ferro-electric ceramic wafer 32 which is a birefringent doubly refractive material. The polarized light entering the ceramic wafer travels with a helical wavefront within the wafer, with the rate of rotation of the polarization being dependent upon the wavelength, and hence the color, of the light. The polarization of the longer wavelengths, such as red, is modified less than the polarization of the shorter wavelengths, such as blue, as a result of the birefringence of the ceramic wafer 32. The light waves then leave the ceramic wafer 32 with the light polarized according to its wavelength or color. The analyzer 34 which is a second polarizer will transmit only light polarized to a predetermined angle. The color of the light that will be transmitted therethrough to the viewing eye 26 corresponds to only those wavelengths of light that have had their direction of polarization rotated by the ceramic material 24 into the angle being transmitted by the analyzer 34. The signals applied through leads 37 and 39 from a pulse forming source 36, determine the magnitude of the polarization modification performed by the ceramic wafer 24, and hence the color of the light, (red, green or blue), transmitted through the composite filter. The pulse forming source 36 may be included in the display control unit 20 of FIG. 1.

Figure 3:
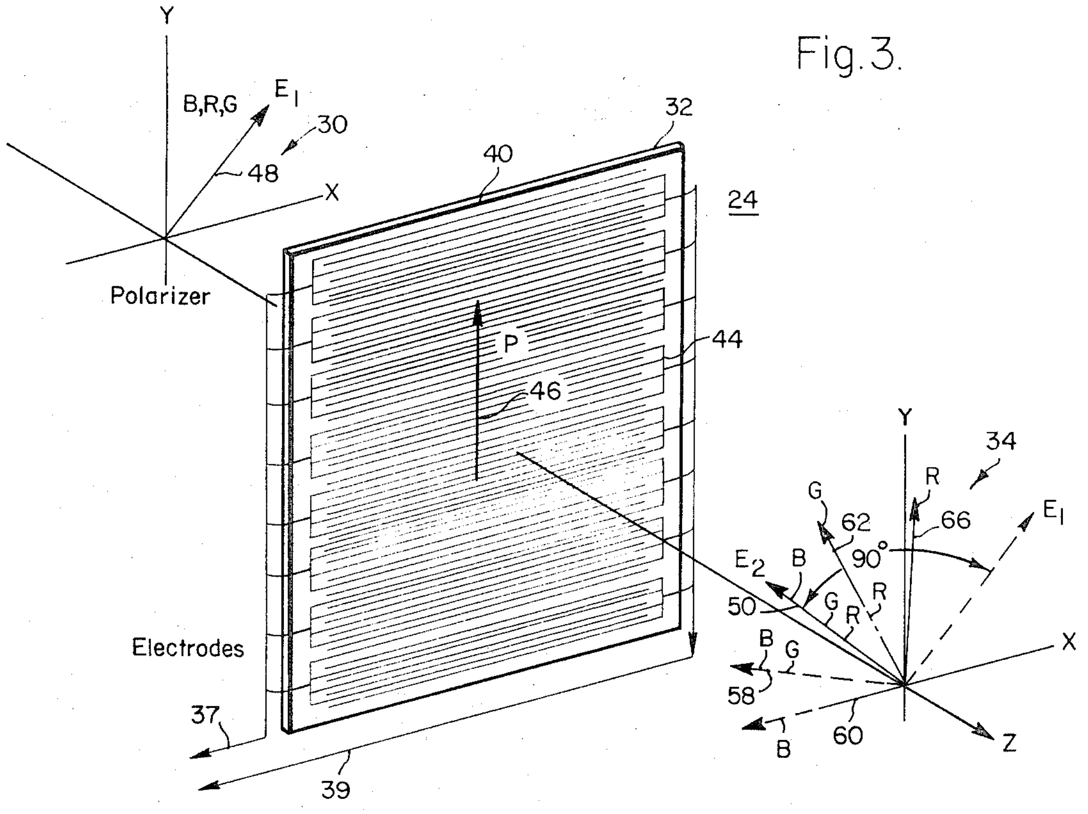
FIG. 3 is a schematic diagram for further explaining the operation of the ferro-electric ceramic spectral filter in accordance with the invention.

Referring now also to FIG. 3, the operation of the tunable filter will be further explained as a function of the angle of polarization of the resultant vector of each primary color. The ceramic wafer 32 at the center thereof has a wafer 40, a first set 42 of interdigital fingers coupled to the lead 37 and a second set 44 of interdigital fingers coupled to the lead 39. The ceramic filter 32 has a polar axis P indicated by a vector 46 vertical along a $\gamma$ axis of the illustrated cartesian coordinate system. The initial polarization of light received from the display surface of the cathode ray tube 22 is in the direction of the polarizer orientation $E_1$ of a vector 48. The vector $E_1$ which may be at 45° relative to the X axis provides plane polarized light including the red, green and blue regions of the visible frequency spectrum. For light to pass entirely through the filter 24 the initial polarization of the vector 48 must be rotated in the ceramic plate 32 to the polarization of the analyzer 34 which is the polarization $E_2$ indicated by a vector 50. The birefringent properties of the ceramic material 32 provides wavelength selection so that each wavelength is rotated an amount so that for one biased dipole condition, only one wavelength is rotated to the angle of the analyzer $E_2$. For the dipoles of the ceramic wafer 32 in a first position to allow red components to pass through the analyzer 34, the retardation is selected so that the red vector is rotated to the position of the polarized direction of the vector 50, the green vector is rotated to the position of a vector 58 and the blue vector is rotated to position of a vector 60. When the dipoles of the ceramic plate 32 are switched, vectors are rotated so that the green vector is in the angular position of the vector 50, the red vector is in position of a vector 62 and the blue vector is in position of the vector 58, so that only the green wavelength is passed through to the observer. For the third position of the sequence, the ceramic plate 32 is switched so that the red vector is in position of a vector 66, the green vector is in position of the vector 62 and the blue vector is in position of the vector 50, to pass through to the observer.

For continuing the sequence, the plate is switched again so that the red vector is in the position of the vector 50 representing the analyzer orientation. For each color, the red, green and blue color components of the image are presented as various intensities of white on the face of the cathode ray tube. The composite filter permits only the red, green or blue component of the white light to pass on to the viewer as electronically selected.

The ferro-electric ceramic material 40 is well known in the art and, for example, may be PZT or KDP (potassium dyhydrogen phosphate) having a birefringent property or any other suitable type of material. The ceramic PZT is discussed in an article entitled, "Ferroelectric Ceramic Light Gates Operated in a Voltage Controlled Mode", by J. R. Maldonado and A. H. Meitzler, page 148, IEEE Transactions, Vol. ED–17, No. 2, February 1970. Also, the birefringent material may be any suitable poled coarse or fine grain ceramic such as thin polished plates of hot pressed lead zirconate-lead titanate ceramics as discussed in an article entitled, "Ferro-electric Ceramic Electro-Optic Materials and Devices", by Cecil E. Land and Philip D. Thatcher published in the Proceedings of the IEEE, Volume 57, Number 5, May 1969. The invention is not to be limited to any particular ferro-electric material but may include any suitable material within the principles of the invention to provide birefringence or retardation of the light energy. Another material is lead titanium zirconium titanate known as PLZT to which lanthanium is added so that the material is transparent. Ferroelectric ceramic materials of the type that may be utilized in the system of the invention are also discussed in U.S. Pat. No. 3,434,122, "Multiremanence Ferroelectric Ceramic Memory Element", by C. E. Land et al., U.S. Pat. No. 3,499,704, "Ferroelectric Ceramic Electro-Optical Device", by C. E. Land et al., U.S. Pat. No. 3,531,182, "Multiremanent Ferroelectric Ceramic Optical Devices", by C. E. Land et al., and U.S. Pat. No. 3,512,864, "Ferroelectric Ceramic Optical Retardation Devices", by C. H. Haertling et al. Another required property of the ceramic material is that it be anisotropic, that is, the velocity of a light wave is not the same in all directions. As is well known in the art, crystals having this property are double refracting or exhibit birefringence. A ray applied to this type of material is broken up into two rays traversing the material, one of which is undeviated and is called the ordinary ray, the other of which is deviated and is called the extraordinary ray. As is well known, both the ordinary and the extraordinary ray have different values of indexes of refraction. The index of refraction is the ratio of the velocity of light through a vacuum over the velocity of light through the material. A material is also selected that operates without excessive light scattering.

Figure 4:
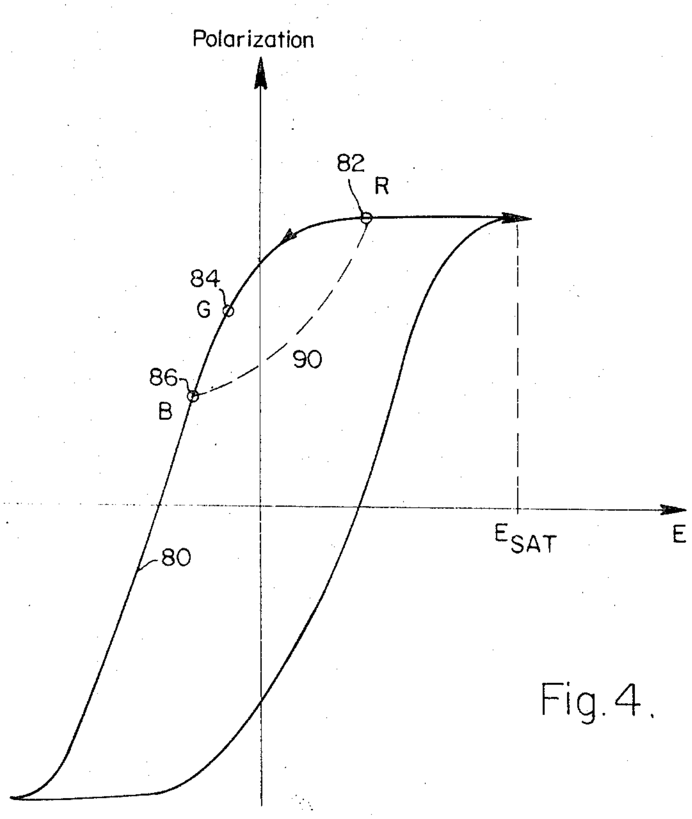
FIG. 4 is a schematic diagram of a hysteresis curve of polarization as a function of applied electric field for explaining the operation of the ceramic filter of the invention.
Figure 5:
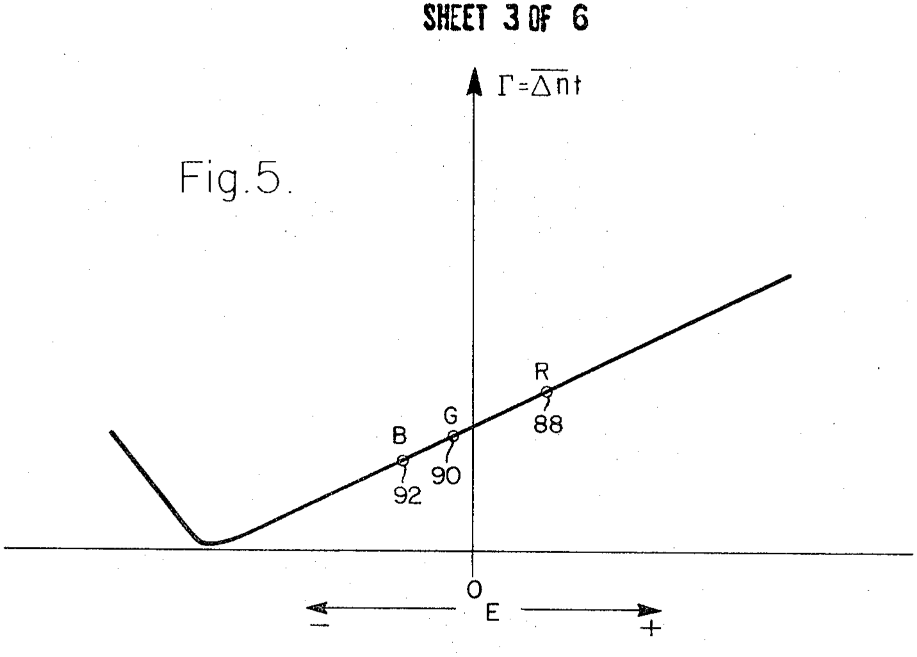
FIG. 5 is a schematic graph showing retardation as a function of applied electric field for the ceramic filter utilized in the system of FIG. 2.

Referring now to the hysteresis curve of FIG. 4 and to the retardation curve of FIG. 5, the hysteresis curve 80 which shows polarization as a function of applied electric field E of the ceramic material and may provide operation in any area where there is a change in polarization for different applied voltages. In the illustrated arrangement, the operation on the curve may be between three points 82, 84 and 86 respectively representing red, green and blue as provided by the retardation of the signals as a result of the orientation of the dipoles. The red, green and blue retardations of the points 82, 84 and 86 respectively provide a retardation Γ of points 88, 90 and 92, which retardation in a constant thickness material rotates each wavelength a different amount. It is to be noted that the retardation Γ is equal to $\overline{\Delta n}\, t$ where $\overline{\Delta n}$ is the effective birefringence and t is the thickness of the ceramic along the Z axis. The effective birefringence is also equal to $\overline{n_e - n_o}$ where $n_e$ is the index of refraction of the extraordinary axis and $n_o$ is the index of refraction in the ordinary axis. Thus, depending on which point of operation is provided the dominant wavelength transmitted and aligned with the polarization of the analyzer is either red, green or blue. As can be seen in FIG. 3, for transmitting the red wavelength as a vector aligned with the vector 50 maximum retardation is required, with less retardations for the points 84 and 86. The material then follows a minor hysteresis loop 90 back to the point 82.

Figure 6:
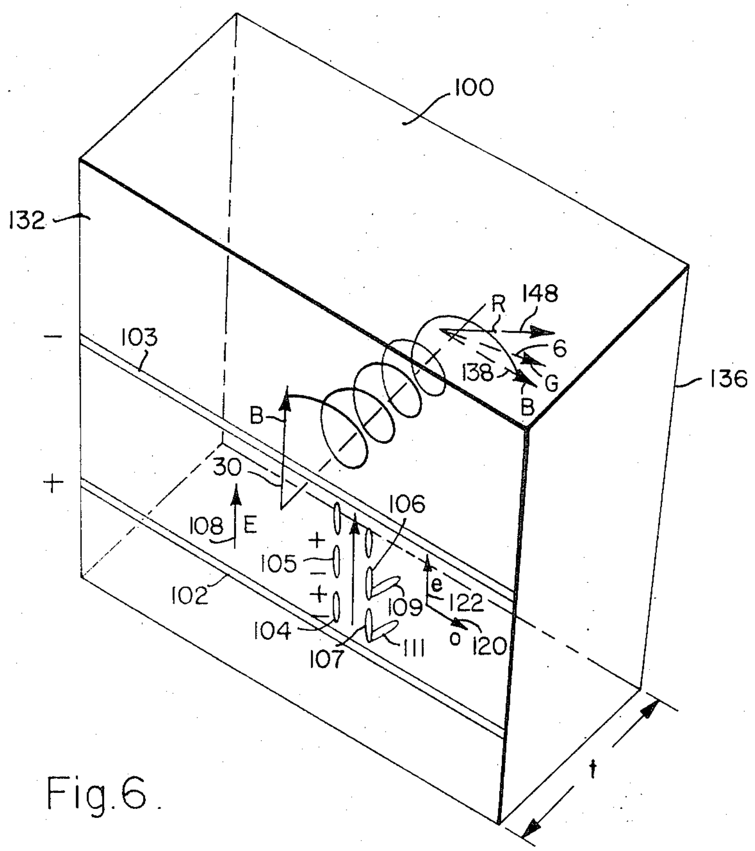
FIG. 6 is a schematic perspective diagram for further explaining the operation of the ceramic ferro-electric material utilized in the system of FIG. 2.

Referring now to FIG. 6, which shows a block 100 of the ferro-electric ceramic wafer, the operation of the interdigital fingers to control the dipole orientation will be further explained. The interdigital fingers such as 102 and 103 may be vapor deposited, for example, on the surface of the block 100 and they may be any suitable conductive transparent material such as indium oxide or cadmium sulphide. The conductive material indium oxide is discussed in the magazine Information Display, Vol 9, No. 1, Jan., Feb. 1972 in an article on page 17 entitled, "Transparent, Conductive Coating of Indium Oxide." Dipoles such as 104 to 107 included in the material respond to an electric field shown by a vector 108 opposite to the polarity of the dipoles. Certain dipoles are rotated as shown by the positions 109 and 111 as a function of a magnitude of the applied static field of the vector 108. It is noted that the material 100 may have an ordinary axis indicated by an arrow 120 and an extraordinary axis indicated by an arrow 122 which is a requirement of a birefringent material. A vector 130 which may be a polarized blue wavelength is applied to the surface 132 of the block 100 and spins through the material 100 in a helical pattern such that each color signal is polarized according to its own wavelength. At the exit surface 136 the blue vector 130 is rotated to a position of a vector 138 and if coincident with the polarization of the analyzer is passed through to the observer. Vectors 140 and 142 representing the green and the red wavelengths have rotated to a different angle of polarization. Thus, as is well known in the art, the angular direction of the majority of the dipoles determines the rotation angle and the retardation in the material. The retardation Γ is a function of the average effective birefringence and the thickness t as is well known in the art. The resultant vector such as 138 is the resultant of the rotation of the ordinary and extraordinary vectors 120 and 122 as is well known in the art is equal to $(2\pi t/\lambda)\ (n_e - n_o)$. Thus, it can be seen that one requirement is that the thickness t will be sufficient to provide desired rotation to correspond to the polarizer rotation.

Figure 7:
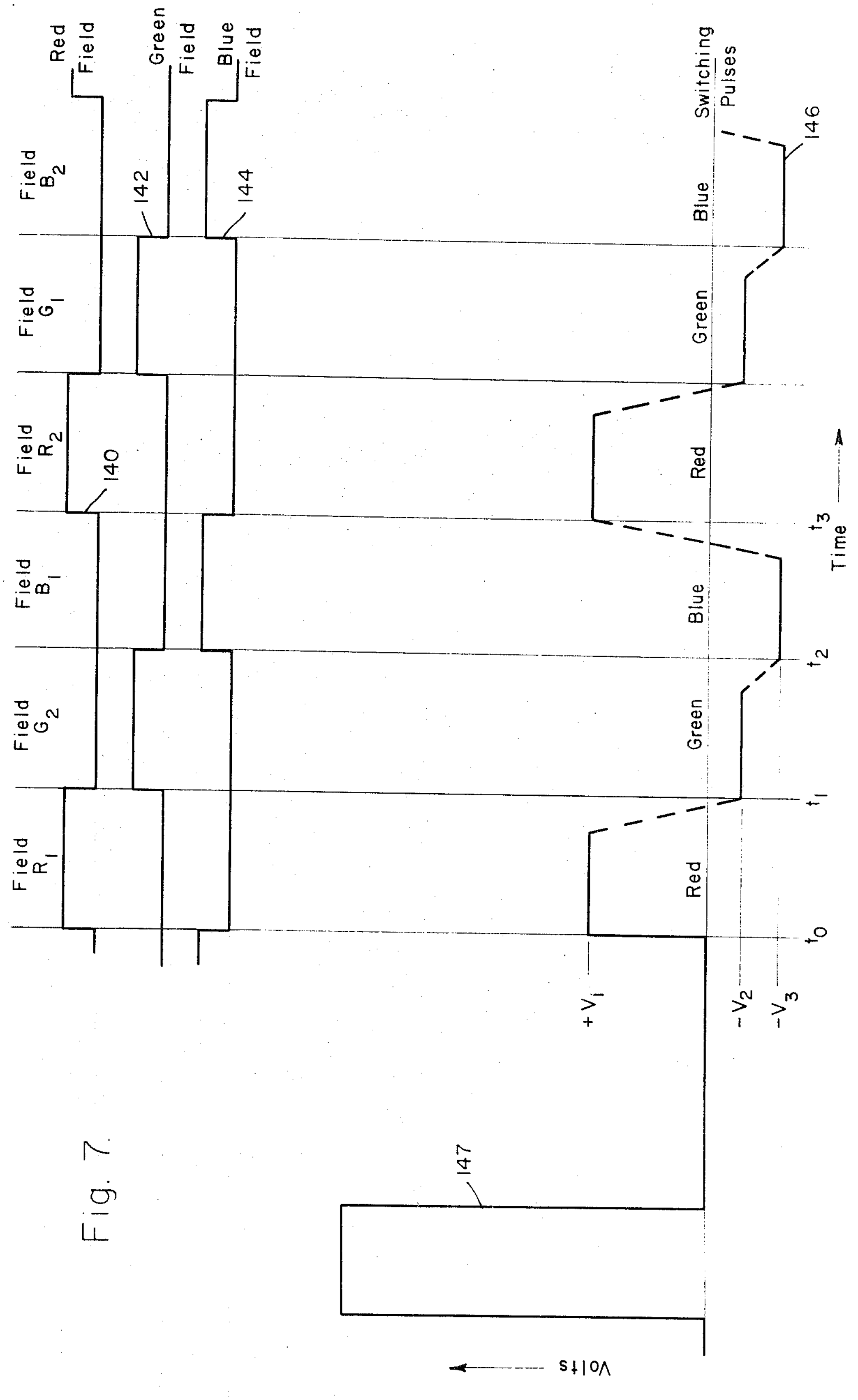
FIG. 7 is a schematic diagram of waveforms of voltage as a function of time for further explaining the operation of the field sequential color television system of FIGS. 1 and 2.

Referring now to FIG. 7, as well as to FIG. 4, a red field, a green field and a blue field are indicated by respective waveforms 140, 142 and 144 and may be timing waveforms utilized for controlling the raster scan of the cathode ray tube, for example. After the ceramic material is initially established in position 84 on the major hysteresis loop 80 in response to a pulse 147 of sufficient amplitude to polarize the material above $E_{sat}$, the sequence is provided at a time $t_0$ with the pulse of a waveform 146 having a voltage +V. The voltage of the waveform 146 is applied between the leads 37 and 39 of FIG. 2 with, for example, one lead 39 being coupled to ground. The material changes to the point 82 providing a red wavelength condition to the viewer. At a time $t_1$ a positive pulse is applied so that the material switches from the point 82 to the point 84 to provide a green wavelength. At a time $t_2$, a negative pulse $-V_2$ is applied to the interdigital fingers relative to ground and the material switches from the point 84 to the point 86 in a predetermined time to provide a blue wavelength to the viewer. At a time $t_3$, the $+V_1$ voltage is applied to the material and it switches from the point 86 to the point 82 along the minor curve 90 to provide a retardation such that a red wavelength is presented to the observer. This sequence continues in a similar manner to provide an electronically controlled field sequential color television system. The illustrative sequence in FIG. 7 is shown for an interlaced color frame having a sequence of fields $R_1$, $G_2$, $B_1$, $R_2$, $G_1$ and $B_2$ as is well known in the art.

Figure 8:
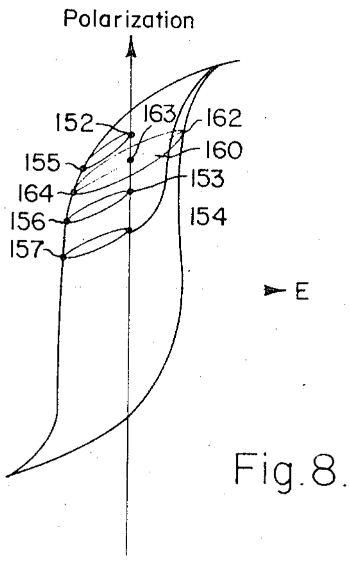
FIG. 8 is a schematic hysteresis diagram of polarization as a function of applied electric field for explaining other modes of operation of the ceramic filter in accordance with the invention.

Referring now to FIG. 8, the hysteresis curve 150 is shown to illustrate other arrangements that may be utilized to vary the retardation of the various wavelengths passing through the ceramic material. One arrangement would be to utilize the points 152, 153 and 154 through points of polarization along the polarization axis with each being established by applying a pulse so that the characteristics of the material passes through respective points 155, 156 and 157 along the major hysteresis loop. Another arrangement that may be utilized is to change the polarization of the material along a minor inner loop 160 between points 162, 163 and 164 respectively representing red, green and blue. It is to be understood that the principles of the invention are not limited to any particular sequence of changing the birefringent properties or the retardation but any suitable arrangement may be utilized.

A typical application of the electronically controlled field sequential color television system of the present invention is shown in copending application Ser. No 115,553, filed Feb. 16, 1971, wherein the structure of the present invention is disclosed for different layers along the face of the cathode ray tube when operating with a multiple beam cathode ray tube.

Figure 9:
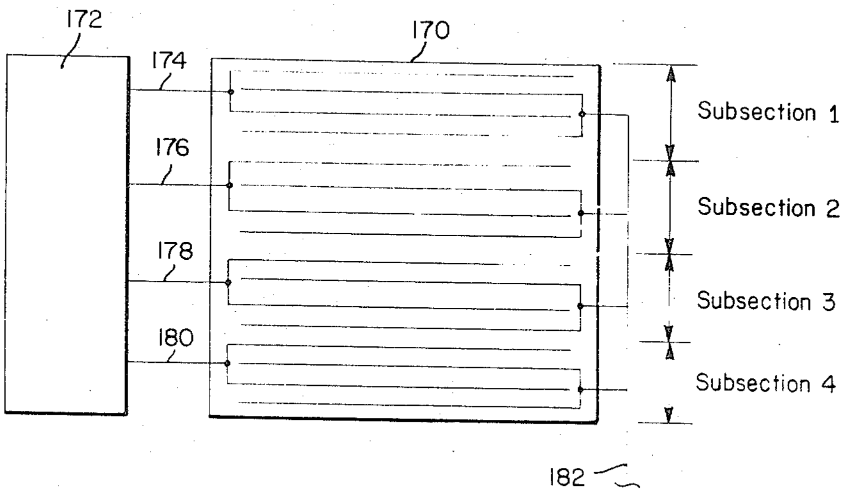
FIG. 9 is a schematic diagram of the ferro-electric ceramic filter utilizing subsections in accordance with the invention.

Referring now to FIG. 9, another arrangement in accordance with the invention includes the ceramic driving structure divided into a plurality of subsections in order to allow more time for switching between colors. The arrangement may include subsections 1 through 4, each controlled by a separate driving source indicated as a source 172 which applies pulses through leads 174, 176, 178 and 180. The other set of digital fingers may be coupled through a lead 182 to a suitable stable source such as ground.

Figure 10:
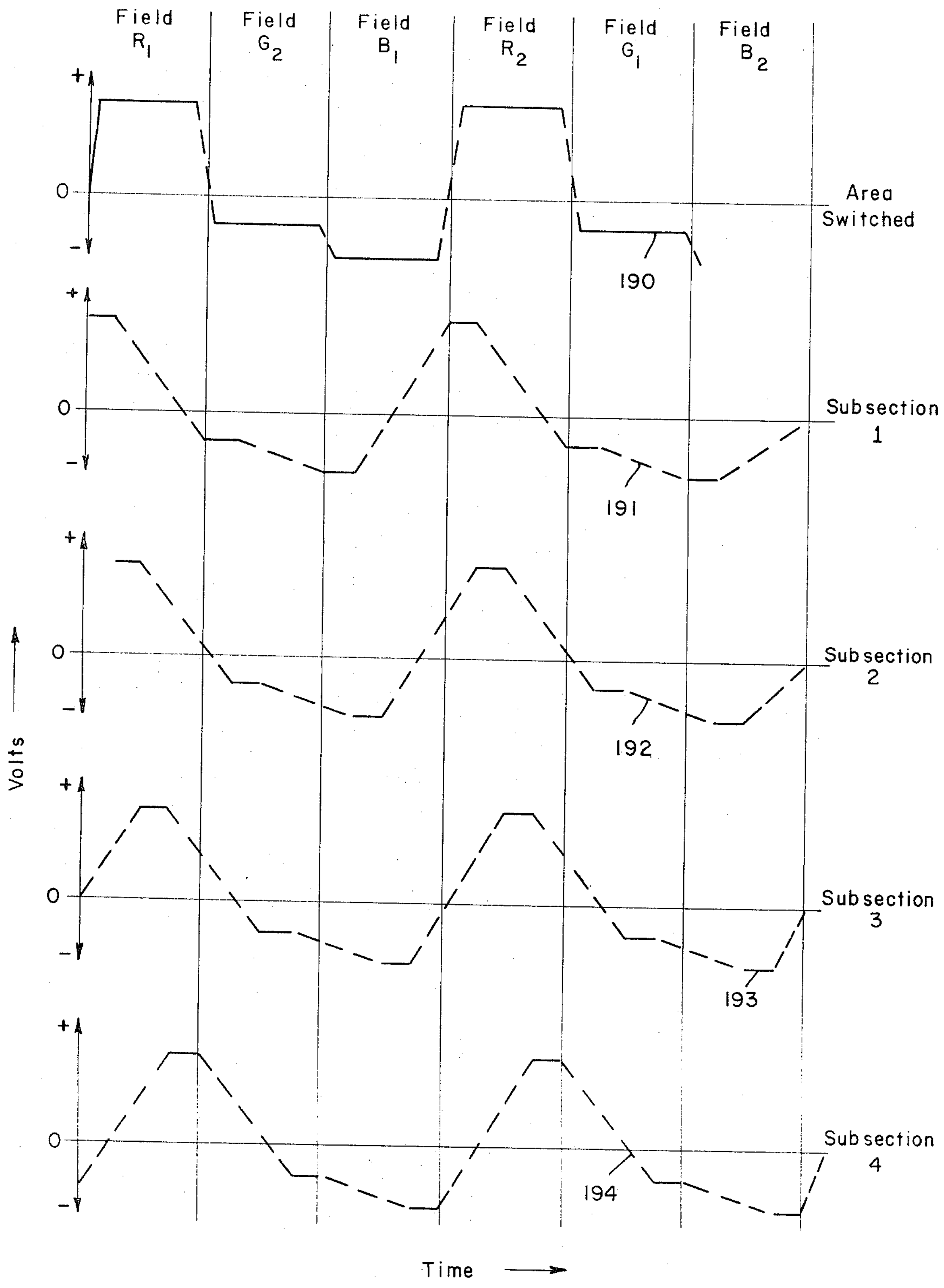
FIG. 10 is a schematic diagram of waveforms of voltage as a function of time for further explaining the switching sequence of the sections of the ceramic material of FIG. 9.

Referring now also to FIG. 10, a waveform 190 shows the driving waveform where the entire area of the ceramic material is switched as one material and a waveform 191 shows the switching pulse that may be applied to subsection 1. The dotted portions of the waveforms such as 191 are to show the transistion from one level to another. Pulses of waveforms 192, 193 and 194 show the driving pulse that may be applied to subsections 2, 3 and 4. The driving arrangement of FIG. 10 is shown for a 2 to 1 interlace scan raster as an illustrative example.

Thus there has been described an improved field sequential color television system utilizing an electronically tunable filter consisting of a ferro-electric ceramic material and two polarizers so that reliable color switching is provided. The electronically switched color filter results in reduced size and weight and increased reliability because of the absence of moving parts. Also because mechanical driving structure and rotating discs or drums are not required, the concepts of the invention result in a very simplified and light weight television system. Because three filters must be sequentially switched, at the rate of 3,600, three color sequences per minute, for example, (with 180 per second in each primary color), the electronic switching system in accordance with the invention provides a highly simplified and increased reliability of operation.

What is claimed is:

1. A field sequential television system comprising a sequentially scanned cathode ray tube having a screen scanned with a sequence of fields and providing a light source, ferro-electric filter means positioned adjacent to said screen and having selectable signal retardation characteristics and including a ferro-electric ceramic material, a deposited first and second interdigital structure on one side of said wafer and first and opposite sides of said wafer, said first polarizer, said ferro-electric ceramic wafer and said second polarizer being respectively positioned between said screen and a viewer, said first polarizer polarizing the light to a predetermined angle and the second polarizer being an analyzer having a predetermined polarity relative to said first polarizer, said ceramic wafer rotating the signals of each wavelength of said light source so that only one bandwidth passes through said analyzer to said viewer during each field of said sequence, and a control source coupled to said first and second interdigital structures controlling the rotation of said ceramic wafer so that different bandwidths pass therethrough during each field.

2. The system of claim 1 in which said ferro-electric ceramic structure is formed of a plurality of sections each having a separate first and second interdigital fingers on the same side of said wafer coupled to said control source, and said control source providing separate and sequential energizing of each of said plurality of sections during each field scan.

3. The system of claim 1 in which the sequence of fields provides interlaced fields.

* * * * *